United States Patent
Liao (10) Patent No.: US 6,732,675 B1
(45) Date of Patent: May 11, 2004

(54) PROTEIN FOAM REMOVER FOR AQUARIUM

(76) Inventor: Shih Hui Liao, No. 42, Lane 98, Sec. 1, Nan Chu Road, Lu Chu Hsiang, Taoyuan Hsien (TW)

(*) Notice: Subject to any disclaimer, the term of this patent is extended or adjusted under 35 U.S.C. 154(b) by 0 days.

(21) Appl. No.: 10/423,273

(22) Filed: Apr. 25, 2003

(51) Int. Cl.$^7$ ............................................. A01K 63/04
(52) U.S. Cl. ................................................ 119/259
(58) Field of Search ............................ 119/259, 261, 119/263; 210/169

(56) References Cited

U.S. PATENT DOCUMENTS

| | | | | |
|---|---|---|---|---|
| 5,888,387 A | * | 3/1999 | Bradley | .................. 210/169 |
| 6,290,844 B1 | * | 9/2001 | Tennyson, Jr. | .............. 210/169 |
| 6,645,376 B2 | * | 11/2003 | Marioni | .................. 210/169 |
| 6,659,043 B1 | * | 12/2003 | Huska | .................. 119/226 |

* cited by examiner

*Primary Examiner*—Charles T. Jordan
(74) *Attorney, Agent, or Firm*—Thomas R. Vigil; Welsh & Katz, Ltd.

(57) ABSTRACT

A protein foam remover of an aquarium comprises a water pump, a protein foam removing means, and a water flow buffer; when the water pump is turned on, the water pump with an air mixing function converts the filthy water containing protein impurities in an aquarium into a water flow with numerous tiny air bubbles, and flows such water into the protein foam remover; the water flow further produces a turbulent whirl in the protein foam remover and moves the foams containing protein impurities to the top of the protein foam remover where a foam collecting cylinder is located for the removal of the foams, and the processed water will flow into a backflow pipe disposed at the bottom of the protein foam remover, and the water flows into a water flow buffer through a diversifying pipe to attain the effect of returning the water without air bubbles to the aquarium.

8 Claims, 8 Drawing Sheets

PROTEIN FOAM REMOVER FOR AQUARIUM

BACKGROUND OF THE INVENTION

1. Field of the Invention

The present invention relates to a protein foam remover for aquarium, particularly to a protein foam remover that provides an excellent protein foam removing effect for aquarium.

2. Description of the Related Art

Although there are all kinds of protein foam removers for aquarium sold in the market, the water pump of these protein foam removers is unable to provide good water flowing and air mixing functions, and thus greatly reducing the effect of bringing out and removing the protein impurities in an aquarium by air bubbles. Further, since the water pump of these traditional protein foam removers cannot produce sufficient water and gas turbulences for a synergic effect by means of the air mixed current, therefore the gas in the water cannot produce sufficient turbulence to subdivide the foams into smaller air bubbles. As a result, the protein foam remover does not have good performance on the foam removing effect.

In view of these shortcomings, the inventor of the present invention based on years of experience accumulated from the engagement in the aquarium equipment related industry and conducted extensive research to resolve the aforementioned shortcomings and invented a protein foam remover for aquarium in accordance with the present invention.

SUMMARY OF THE INVENTION

The primary objective of the present invention is to provide a protein foam remover for aquarium that produces numerous air bubbles in the water flowing into the protein foam remover by means of the excellent air mixing function of the water pump and a jet connector in the whirling tank is used to produce a turbulent whirl of the air mixed water in the whirling tank so that the air bubbles in the air mixed water produces denser and smaller air bubbles to effectively bring the protein impurities in the water to the surface of the water.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
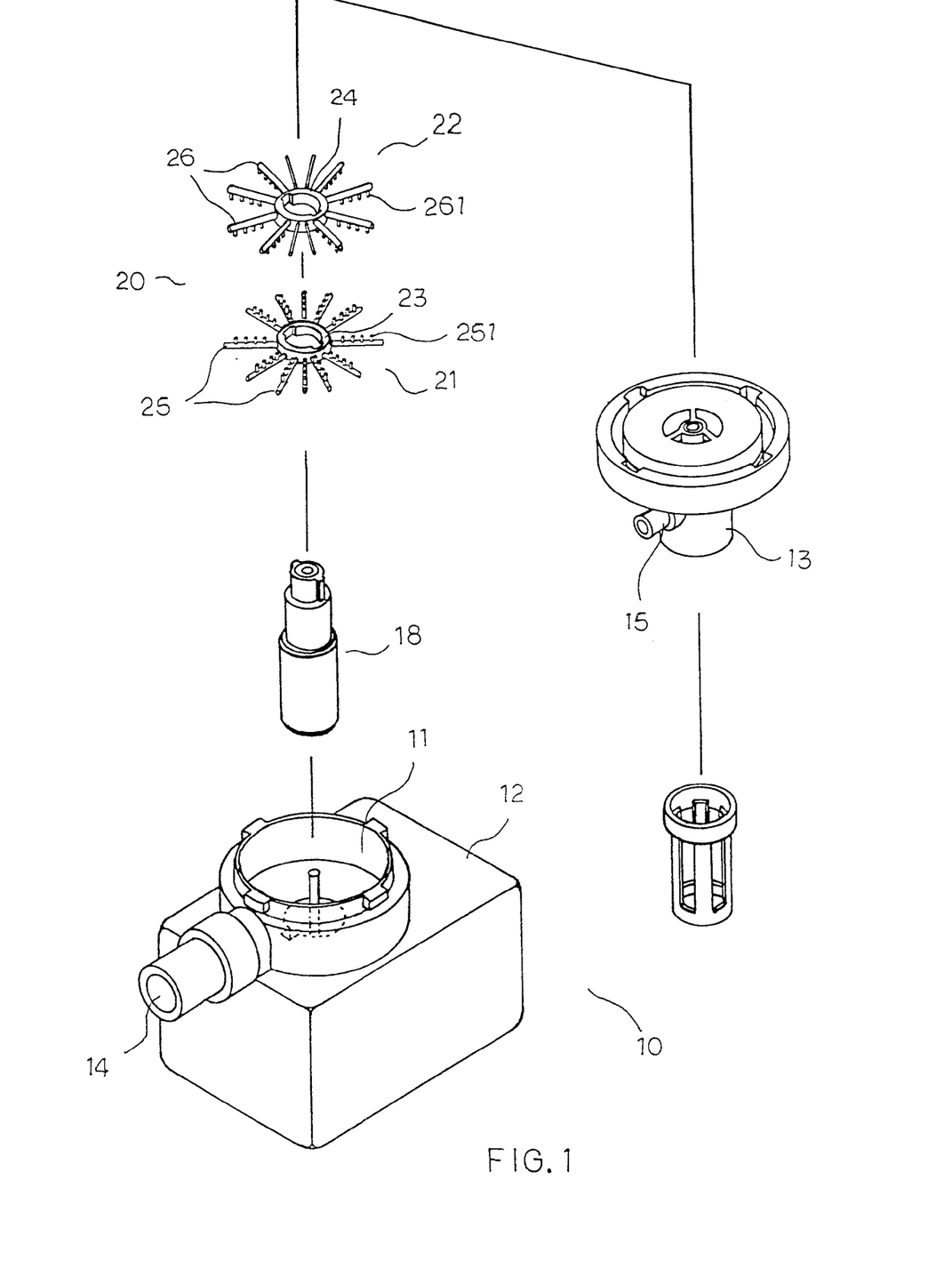
FIG. 1 is a perspective diagram of the disassembled parts of the water pump in inverted position according to the present invention.
Figure 2:
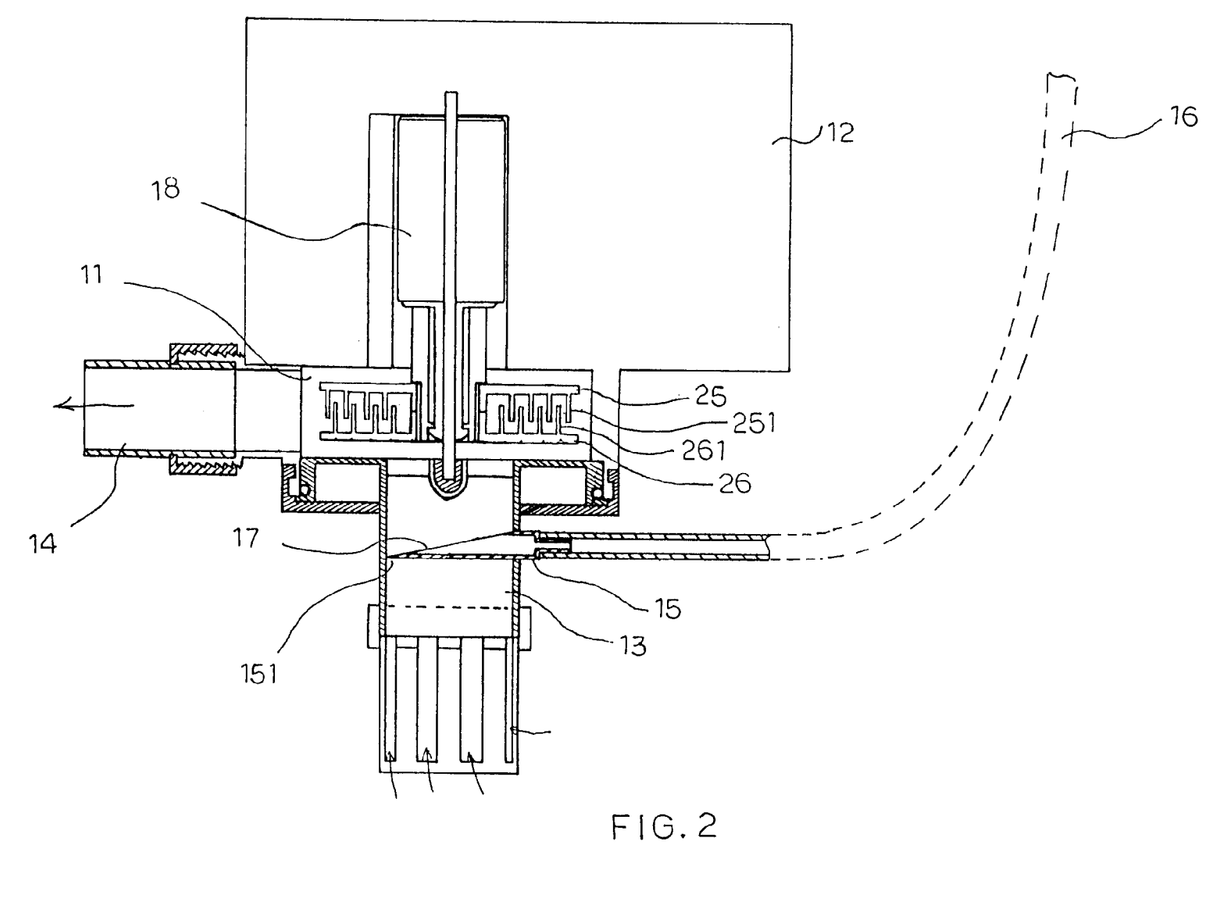
FIG. 2 is an illustrative diagram of the structure of the water pump as shown in FIG. 1.

Please refer to the figures. The protein foam remover for aquarium according to the present invention comprises a water pump 10, a protein foam removing means 30, and a water flow buffer 50; wherein the water pump 10 as shown in FIGS. 1 and 2 is consisted of a pump body 12 having an incoming chamber 11, an incoming pipe 13 extended downward from an opening at the bottom of the incoming chamber 11, an outgoing pipe 14 extended sideway from one side of the incoming chamber 11, a vane 20 for drawing and whirling the water flow in the incoming chamber 11, an air inlet connector 15 disposed at an appropriate position on the sidewall of the incoming pipe 13 and perpendicularly coupled with the incoming pipe 13 and pressing against the corresponding inner side 151 of the incoming pipe 13, an air supply pipe connected to the outer side of the air inlet connector 15 protruding above the water surface of an aquarium A, and an aslant cut opening 17 disposed on the upper surface of the air inlet connector 15 in the incoming pipe 13 and facing the vane 20.

The vane 20 comprises an upper vane 21 and a lower vane 22, both having a fixed connector 23, 24 disposed on the end of a rotor 18 of the water pump 10, and the outer side of the periphery of the two fixed connector 23, 24 has a plurality of pairs of symmetric and radial blades 25, 26. The radial blade 25 of the upper vane 21 is vertically interlaced with the radial blade 26 of the lower vane 22. The inner side of these radial blades 25, 26 has a transversal whirling rod 251, 261 disposed at an appropriate interval from each other, and the transversal whirling rods 251 on the upper vane 21 and the transversal whirling rods 261 on the lower vane 22 are interlaced sideway and interlaced and stacked vertically.

Figure 3:
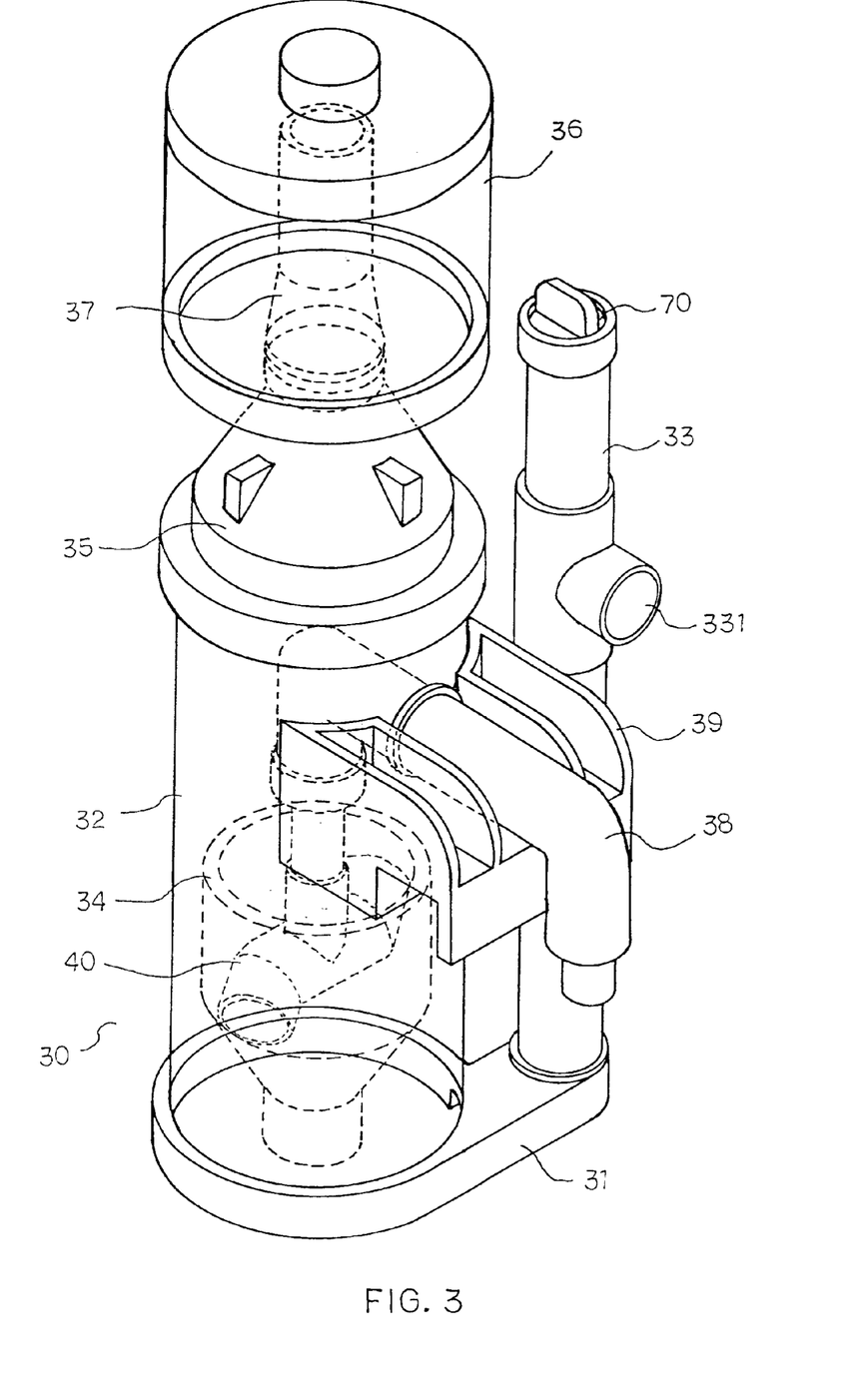
FIG. 3 is a perspective diagram of the protein foam remover of the present invention.
Figure 4:
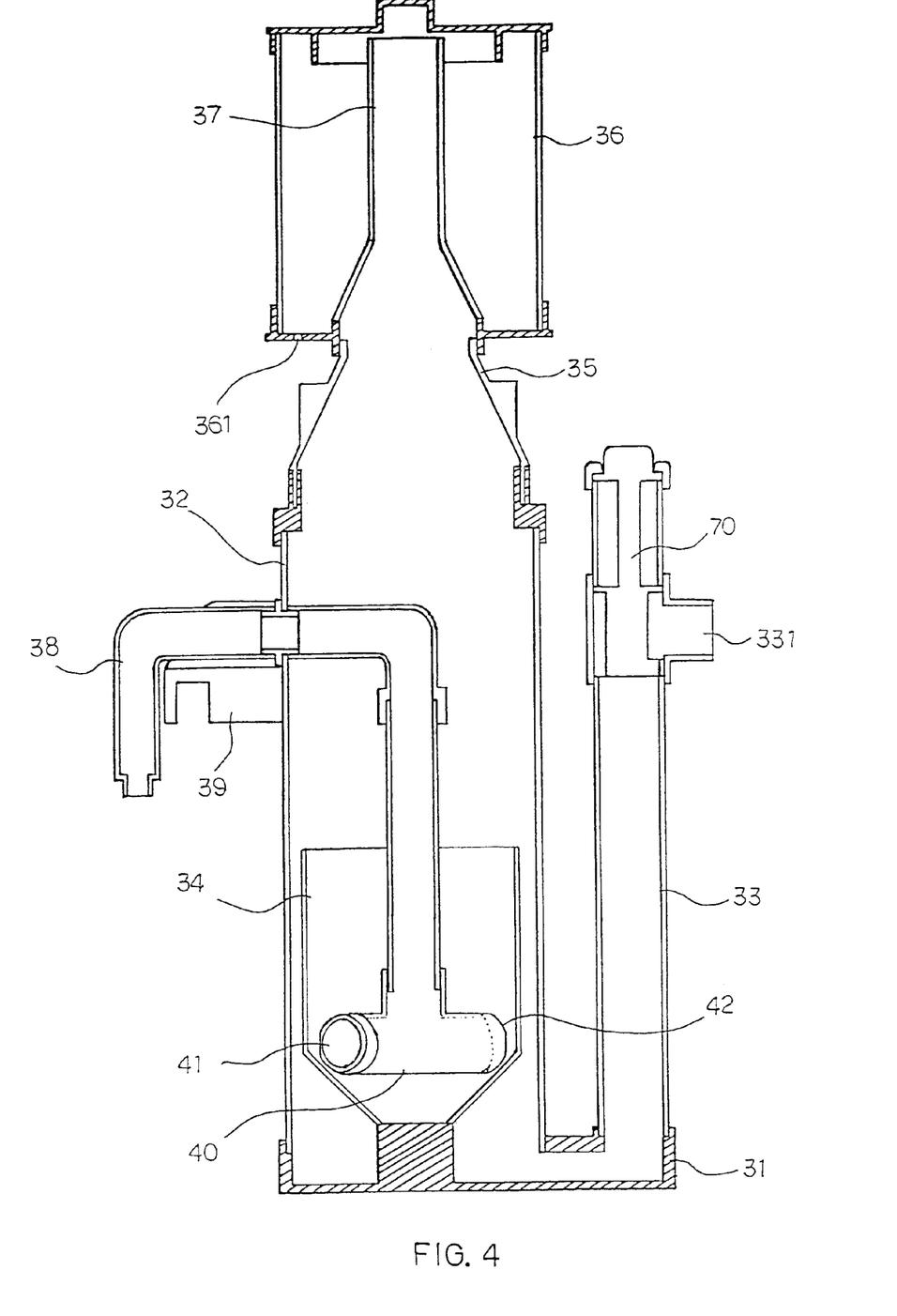
FIG. 4 is an illustrative diagram of the structure of the protein foam remover as shown in FIG. 3.
Figure 6:
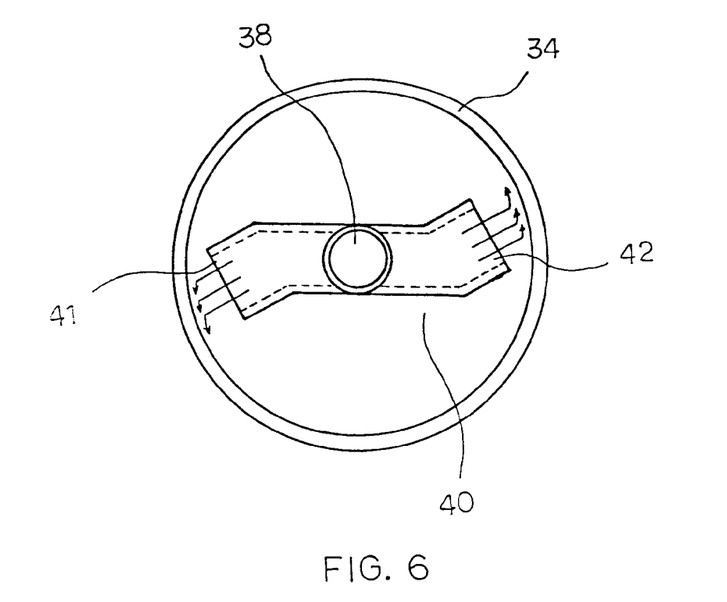
FIG. 6 is an illustrative diagram of the actions of the inject connector of the protein foam remover in the whirling tank according to the present invention.

The protein foam remover 30 as shown in FIGS. 3 and 4, comprises a hollow cylindrical foam removing body 32 disposed at a lower base 31, a backflow pipe 33 connected to the bottom of the foam removing body 32 and disposed on one side of the lower base 31, a cylindrical whirling tank 34 having a bottom substantially in a conical shape and disposed on the inner side of the bottom of the foam removing body 32, a foam outlet connector 35 in a flare tapered shape disposed at the top end of the foam removing body 32, and the top end of the foam outlet connector 35 being coupled with the bottom of a central vertical foam inlet pipe 37 disposed on a protein foam collecting cylinder 36, an incoming pipe 38 passing through and being disposed on an appropriate position on the sidewall of the foam removing body 32, and the outer side of the incoming pipe 38 is coupled with the outgoing pipe 14 (not shown in the figure) disposed on the water pump 10, and the inner side of the incoming pipe 38 is appropriately extended downward into the whirling tank 34. Further, the incoming pipe 38 at the end of its inner side has a jet connector 40 each appropriately extended toward the two corresponding sides, and both ends of the jet connector 40 respectively have a jet opening 41, 42 for spraying the water at an appropriate angle as shown in FIG. 6.

Figure 5:
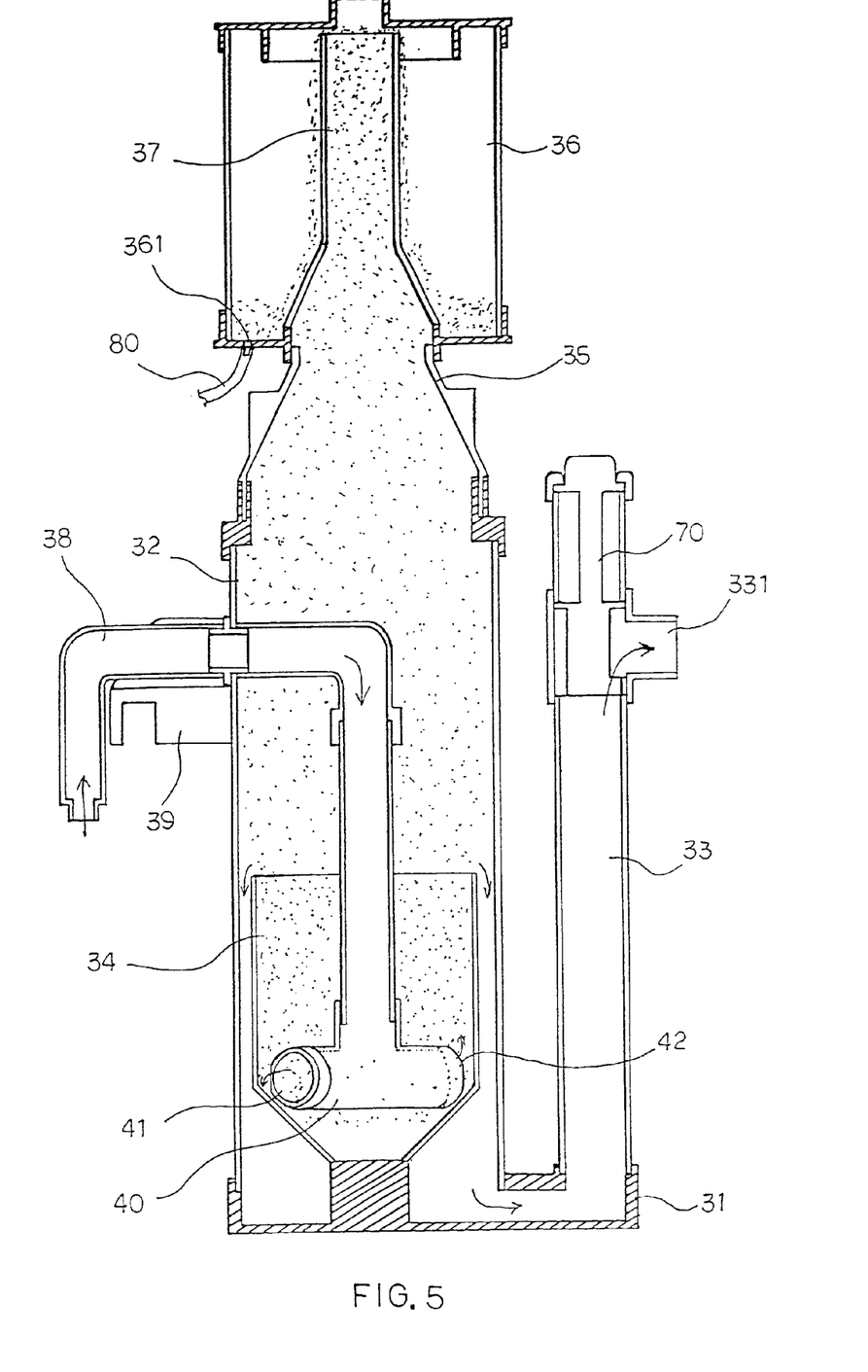
FIG. 5 is an illustrative diagram of the actions of the protein foam remover according to the present invention.
Figure 7:
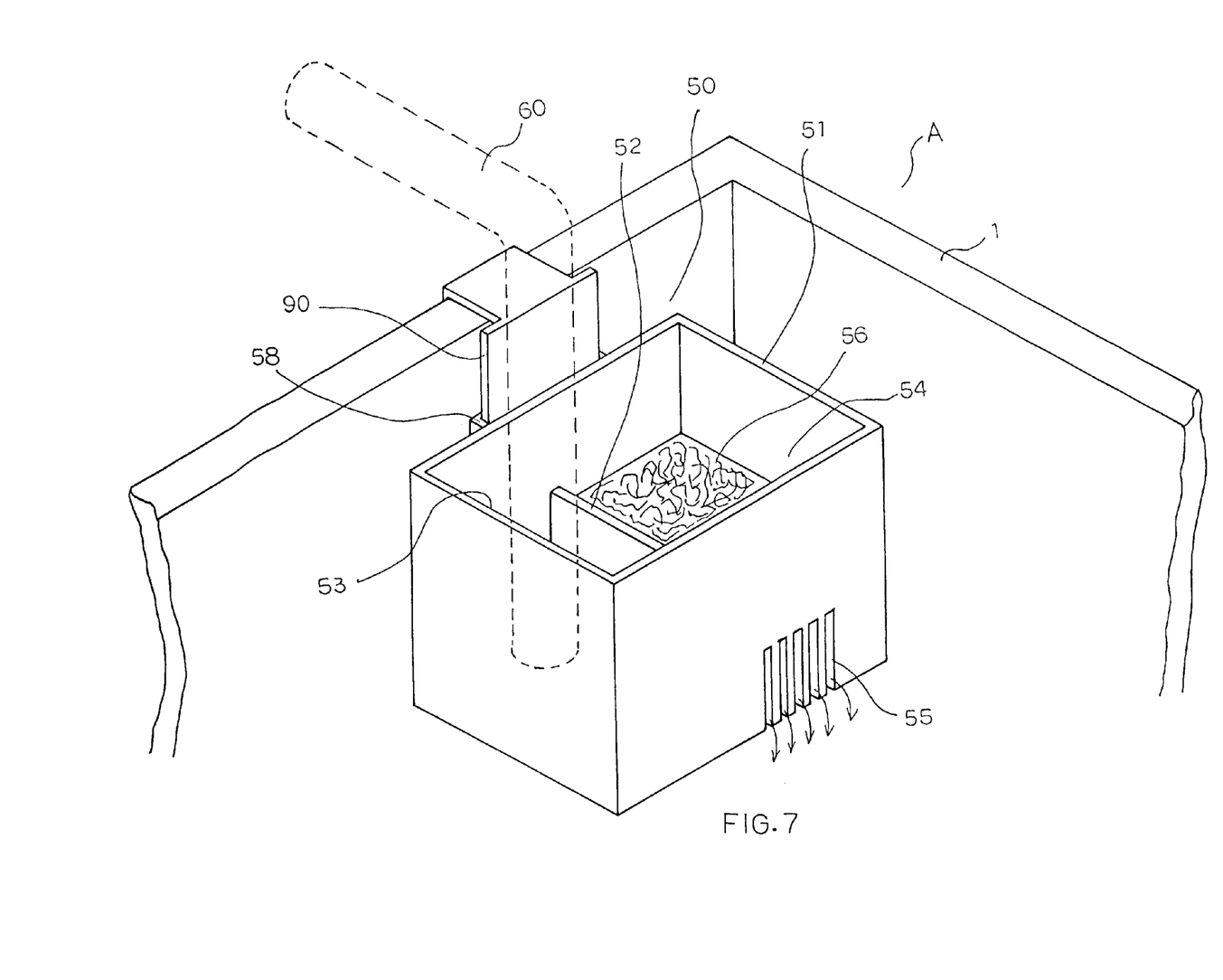
FIG. 7 is a perspective diagram of the water flow buffer being hung on the sidewall of an aquarium according to the present invention.
Figure 8:
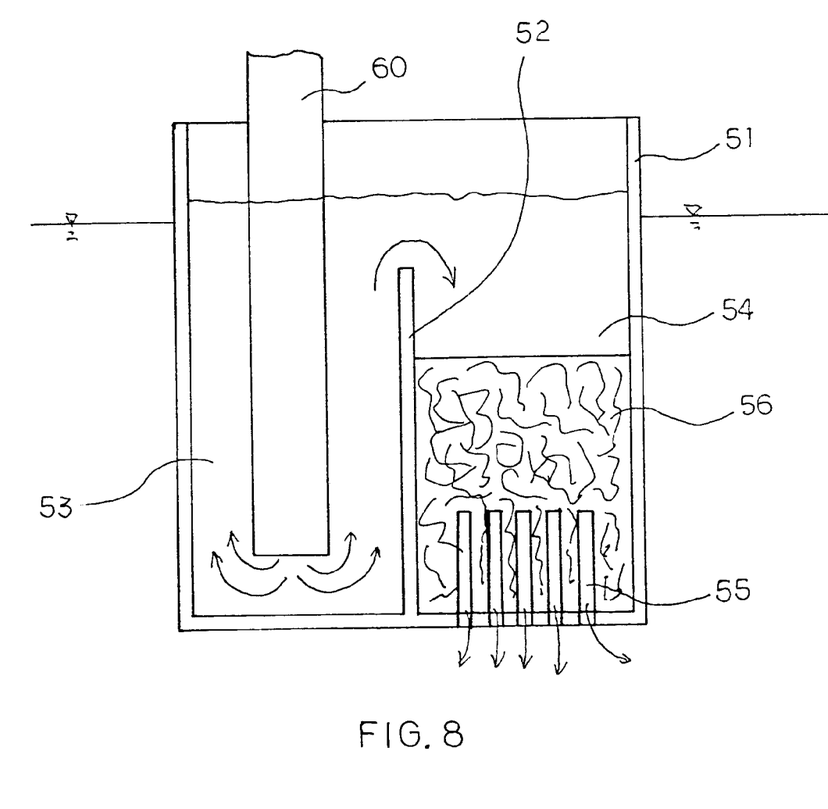
FIG. 8 is an illustrative diagram of the actions of the water flow buffer according to the present invention.

The water flow buffer 50 is comprised of a box body 51 hung at a position with an appropriate height of the interior of a sidewall of an aquarium A as shown in FIG. 7. The box body 51 is divided into an incoming chamber 53 and an air bubble removing chamber 54 by an inner wall lower than the central partitioning wall 52 in the box body 51, and the lower section of the air bubble removing chamber 54 has a plurality of groove openings 55 passing through the sidewalls and bottom of the box body 51. Further, the water flow buffer 50 has an air bubble isolating layer 56 in the air bubble removing chamber 54 for isolating the air bubbles in the water. In the incoming chamber 53, an end of the incoming chamber is coupled to a diversifying pipe 60 disposed at the backflow pipe 33 of the protein foam remover 30, therefore with the assembling of the foregoing component and when the water pump 10 is turned on, the water pump 10 with an air mixing function produces a water flow with numerous tiny air bubbles from the filthy water containing protein impurities and such water flows into the protein foam remover 30. By the corresponding structure of the jet openings 41, 42 of the jet connector 40 and the inner wall of the whirling tank 34, the water containing air bubbles further generates a turbulent whirl and moves the foam with protein impurities up and passes the outlet connector 35 and the central vertical foam inlet pipe 37 of the protein foam collecting cylinder 36 and then overflows from the upper end of the foam inlet pipe 37 into the protein foam collecting cylinder 37 to complete the collection and removal of the protein impurities as shown in FIG. 5. The water processed by the protein foam remover 30 flows from the lower base 31 of the protein foam remover 30 to the backflow pipe 33, and then to the incoming chamber 53 of the water flow buffer 50 connected to the diversifying pipe 60. The water flow in the incoming chamber 53 further overflows through the central partitioning wall 52 into the air bubble removing chamber 54, and finally isolates the air bubbles in the water by the air bubble isolating layer 56, so that the processed water without air bubbles flows through the groove hole 55 at the bottom of the air bubble removing chamber 54 back into the aquarium A as shown in FIGS. 7 and 8.

Further, a water flow adjusting device 70 for adjusting the water flow is disposed at the position of an outlet hole 331 of the backflow pipe 33 as shown in FIGS. 4 and 5 to effectively adjust the water level of the processed water in the protein foam remover.

Further, a guiding hole 361 is disposed at an appropriate position on the bottom of the protein foam collecting cylinder 36 for installing a guiding pipe to automatically remove the protein foams and impurities accumulated in the protein foam collecting cylinder 36.

Figure 9:
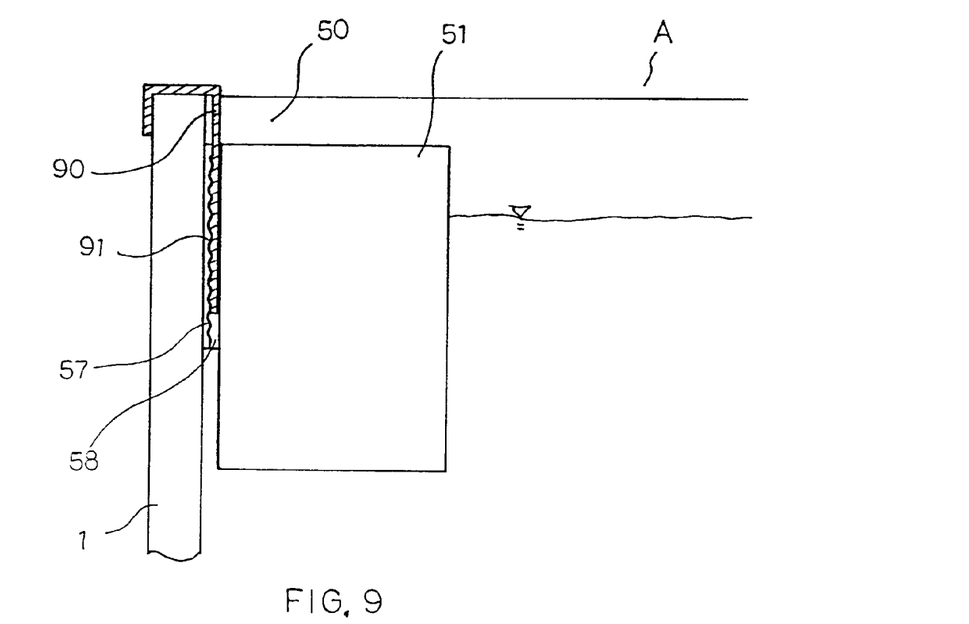
FIG. 9 is an illustrative diagram of the structure between the water flow buffer and the aquarium according to a first preferred embodiment of the present invention.
Figure 10:
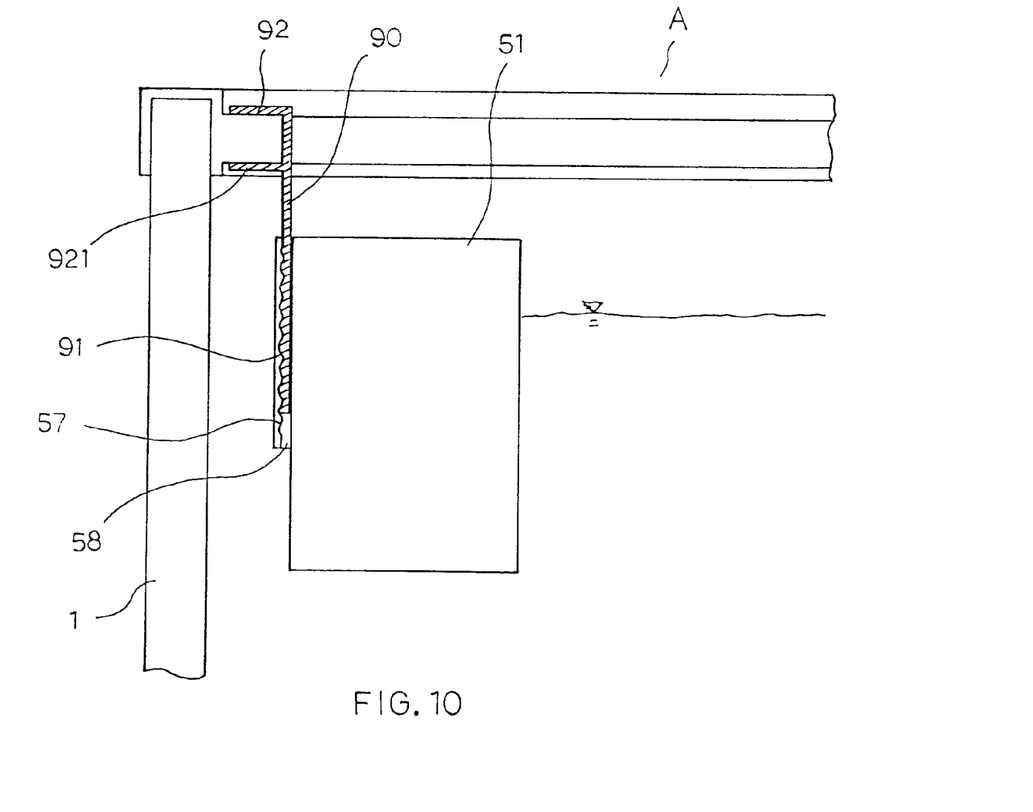
FIG. 10 is an illustrative diagram of the structure between the water flow buffer and the aquarium according to a second preferred embodiment of the present invention.

In addition, the water flow buffer 50 as shown in FIG. 7 has a vertical insert groove 58 having a fixed wave-shape embedding bars 57 on its inner wall and disposed on the outer side of the box body 51, such that the vertical insert groove 58 can fix a hanger 90 having corresponding fixed wave-shape embedding bars 91 by a bracket corresponding to the sidewall. The top end of the hanger 90 has a fixed embedding groove 92 disposed the top of a sidewall of the aquarium A and attains the effect of fixing the water flow buffer 50 to an appropriate height in the aquarium A. In FIG. 9, the hanging structure at the fixed embedding groove of the hanger 90 is formed by bending the outer sidewall of the aquarium outward and then downward. In FIG. 10, the fixed embedding groove 92 disposed on the hanger 90 comprises an upper bracket 921 with its end being vertically bent towards the aquarium A, and a lower bracket 922 parallel to the fixed embedding groove 92 disposed at an appropriate distance from the bottom of the upper bracket 921.

The air bubble isolating layer 56 in the water flow buffer 50 is composed of a sponge layer of an appropriate thickness.

In addition, the outer side of the foam body 32 of the protein foam remover 30 has a hanging device 39 being hung on the upper edge of the sidewall 1 of the aquarium A and disposed at a position through where the incoming pipe 38 passes, so that the protein foam remover 30 can be hung on the sidewall of the aquarium A directly.

In summation of the above description, since the protein foam remover for aquarium disclosed in this invention produces denser and smaller air bubbles in the water flow to effectively adhere them to the surface of the protein impurities in the water flow in order to effectively remove the protein impurities out of the aquarium. Therefore, this invention is significantly useful and there is no identical or similar protein foam remover for aquarium found in the market. In addition, his invention complies with the patent application requirements and is submitted to the Patent and Trademark Office for review and granting of the commensurate patent rights.

What is claimed is:

1. A protein foam remover for aquarium, comprising a water pump, a protein foam removing means, and a water flow buffer, wherein:

said water pump comprising a pump body with an incoming chamber, an incoming pipe extended downward from an opening at the bottom of said incoming chamber, an outgoing pipe extended sideway from one side of said incoming chamber, a vane for drawing and whirling the water flow into said incoming chamber, an air inlet connector disposed at an appropriate position on the sidewall of said incoming pipe and perpendicularly coupled with said incoming pipe and pressing against the corresponding inner side of said incoming pipe, an air supply pipe connected to the outer side of the air inlet connector protruding above the water surface of an aquarium, and an aslant cut opening disposed on the upper surface of said air inlet connector in said incoming pipe and facing said vane;

said protein foam removing means comprising a hollow cylindrical foam removing body disposed on a lower base, a backflow pipe connected to the bottom of said foam removing body and disposed on one side of the lower base, a cylindrical whirling tank having a bottom substantially in a conical shape and disposed on the inner side of the bottom of said foam removing body, a foam outlet connector in a flare tapered shape disposed at the top end of said foam removing body, and the top end of said foam outlet connector being coupled with the bottom of a central vertical foam inlet pipe disposed on a protein foam collecting cylinder, an incoming pipe passing through and disposed on an appropriate position on the sidewall of said foam removing body, and the outer side of said incoming pipe being coupled to said outgoing pipe disposed on said water pump, and the inner side of said incoming pipe being appropriately extended downward into the water flow whirling tank; said incoming pipe at the end of its inner side having a jet connector each appropriately being extended toward two corresponding sides, and both ends of said jet connector respectively having a jet opening for spraying the water at an appropriate angle;

said water flow buffer, comprising a box body hung on a position with an appropriate height of the inner sidewall of said aquarium, and the box body being divided into an incoming chamber and an air bubble removing chamber by an inner wall lower than the central partitioning wall in said box body, and the lower section of said air bubble removing chamber having a plurality of groove openings passing through the sidewalls and bottom of said box body, and the water flow buffer having an air bubble isolating layer in said air bubble removing chamber for isolating the air bubbles in the water; in said incoming chamber, one end of said incoming chamber being coupled to a diversifying pipe disposed at a backflow pipe of said protein foam remover, therefore with the assembling of the foregoing component and when the water pump being turned on, the water pump with an air mixing function producing a water flow with numerous tiny air bubbles from the filthy water containing protein impurities and flowing such water into said protein foam remover; by the corresponding structure of the jet openings of said jet connector and the inner wall of said whirling tank, the water containing air bubbles further generating a turbulent whirl and moving the foam with protein impurities up and passing said outlet connector and the central vertical foam inlet pipe of said protein foam collecting cylinder and then overflowing from the upper end of said foam inlet pipe into said protein foam collecting cylinder to complete the collection and removal of the protein impurities; the water processed by said protein foam remover flowing from the lower base of said protein foam remover to the backflow pipe, and then to the incoming chamber of said water flow buffer connected to said diversifying pipe; the water flow in the incoming chamber further overflowing through said central partitioning wall into said air bubble removing chamber, and finally isolating the air bubbles in the water by said air bubble isolating layer, so that the processed water without air bubbles flowing through the groove hole at the bottom of said air bubble removing chamber back into the aquarium.

2. The protein foam remover for aquarium of claim 1, wherein said vane comprises an upper vane and a lower vane, both having a fixed connector disposed on the end of a rotor of said water pump, and the outer side of the periphery of said two fixed connector having a plurality of pairs of the symmetric and radial blades; said radial blade of the upper vane being vertical interlaced with the radial blade of said lower vane; the inner side of said radial blades having transversal whirling rods disposed at an appropriate interval from each other, and the transversal whirling rods on said upper vane and the transversal whirling rods on said lower vane being interlaced sideway and interlaced and stacked vertically.

3. The protein foam remover for aquarium of claim 1, wherein said backflow pipe has a water flow adjusting device disposed at the position of the outlet hole of said backflow pipe for adjusting the water flow.

4. The protein foam remover for aquarium of claim 1, wherein said protein foam collecting cylinder has a guiding hole disposed at an appropriate position on the bottom of said protein foam collecting cylinder for automatically removing and overflowing the protein foams and impurities into said protein foam collecting cylinder.

5. The protein foam remover for aquarium of claim 1, wherein said air bubble isolating layer is a sponge layer with an appropriate thickness.

6. The protein foam remover for aquarium of claim 1, wherein said water flow buffer has a vertical insert groove with a plurality of fixed wave-shape embedding bars on its inner wall and disposed on the outer side of said box body, such that the vertical insert groove fixing a hanger having corresponding fixed wave-shape embedding bars by a bracket corresponding to the sidewall; the top end of said hanger having a fixed embedding groove disposed the top of a sidewall of the aquarium and attaining the effect of fixing the water flow buffer to an appropriate height in the aquarium.

7. The protein foam remover for aquarium of claim 6, wherein said hanger is a hanging structure disposed at the fixed embedding groove of said hanger and formed by bending the outer sidewall of the aquarium outward and then downward.

8. The protein foam remover for aquarium of claim 6, wherein said hanger comprises an upper bracket with its end vertically bent towards the aquarium, and a lower bracket parallel to the fixed embedding groove and disposed at an appropriate distance from the bottom of the upper bracket.

* * * * *